May 26, 1953        R. H. RINES        2,640,190
SYSTEM FOR MEASURING THE THICKNESS OF OPAQUE OBJECTS
Filed Sept. 4, 1945                    2 Sheets-Sheet 1

INVENTOR.
Robert H. Rines
BY
David Rines
ATTORNEY.

May 26, 1953 R. H. RINES 2,640,190
SYSTEM FOR MEASURING THE THICKNESS OF OPAQUE OBJECTS
Filed Sept. 4, 1945 2 Sheets-Sheet 2

INVENTOR.
Robert H Rines
BY
David Rines
ATTORNEY.

Patented May 26, 1953

2,640,190

UNITED STATES PATENT OFFICE 2,640,190

SYSTEM FOR MEASURING THE THICKNESS OF OPAQUE OBJECTS

Robert Harvey Rines, Brookline, Mass.

Application September 4, 1945, Serial No. 614,361

26 Claims. (Cl. 343—5)

The present invention relates to electric systems, and more particularly to systems for measuring the thickness of opaque objects, and indicating electrically any deviations from a given thickness.

An object of the invention is to provide a new and improved system for measuring the thickness of opaque objects.

A further object is to provide a new and improved means for indicating any deviations of the thickness of the opaque material from a given thickness.

Still a further object is to provide a new and improved means for controlling the thickness of opaque material in the process of manufacture. From a more general viewpoint, an additional object is to provide a novel system for measuring changes in path lengths of energy transmitted or reflected from different surfaces.

Other and further objects will be explained hereinafter, and will be particularly pointed out in the appended claims.

Figure 1:
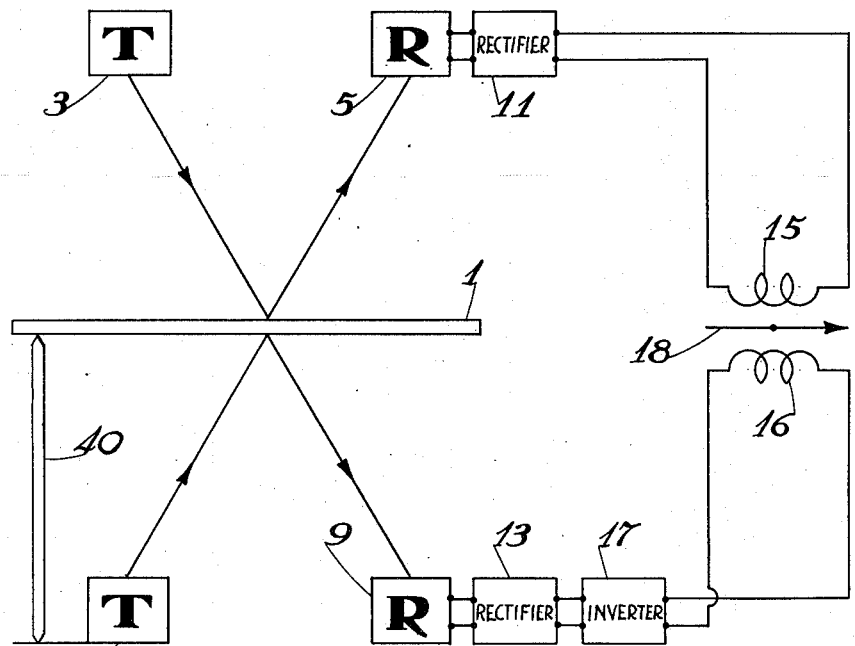
Figure 2:
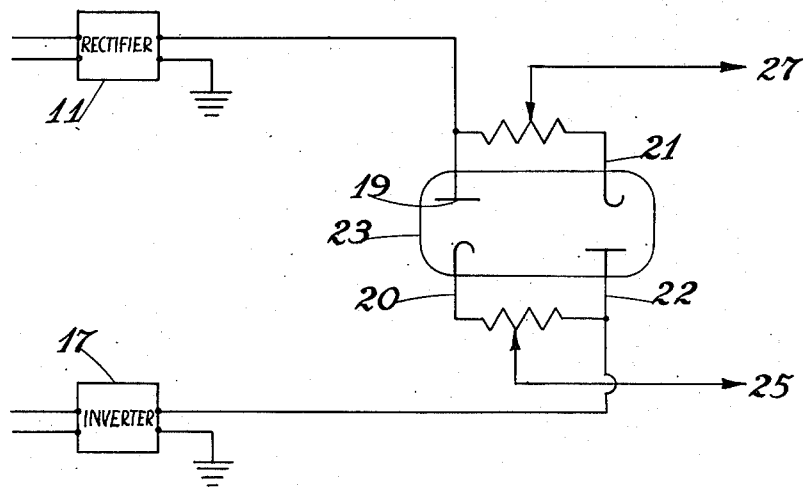
Figure 3:
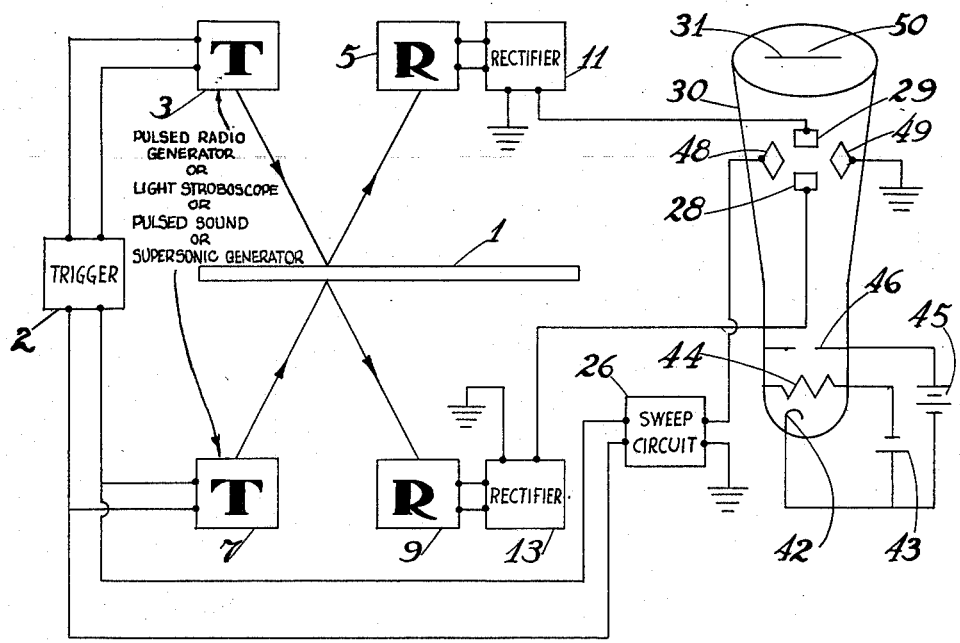
Figure 4:
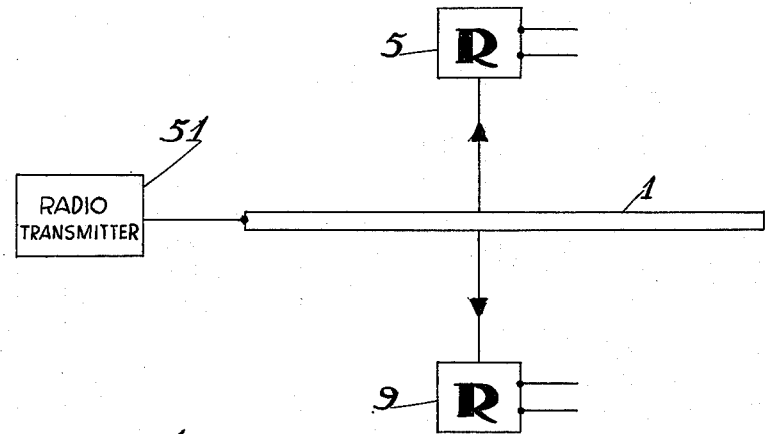

The invention will now be explained more fully in connection with the accompanying drawings, in which Fig. 1 is a diagrammatic view of circuits and apparatus designed and constructed in accordance with a preferred embodiment thereof; and Figs. 2, 3 and 4 are views of modifications.

Electromagnetic energy from a continuous-wave source 3, such as a radio generator, is shown directed toward and reflected from one surface of a material 1, at least in part opaque to the energy, to be received in a near-by receiver 5, such as a radio receiver. A similar energy source 7 and a similar energy receiver 9 are shown, respectively emitting and receiving energy of the same frequency on the opposite side of the opaque material 1. In view of the fact that the angle of incidence equals the angle of reflection, as is true of specular reflection, the paths of travel of the direct and the reflected rays will be fixed for a material of a predetermined thickness. The output of the receivers 5 and 9 are respectively fed to rectifiers 11 and 13. The rectifier 13 is followed by an inverter amplifier 17 such that the output of the amplifier 17 is of opposite polarity to the output of the rectifier 11. The outputs will therefore produce opposing fields in a differential circuit, such as a meter, shown provided with coils 15 and 18 and a needle 18.

The path lengths of the energy from the transmitters 3 and 7, reflected and thus emitted from the opposite surfaces of the material 1 to the receivers 5 and 9, may be adjusted so that the outputs of the respective rectifiers 11 and 13 shall be of equal magnitude. The inverter amplifier 17 will reverse the polarity of the output of the rectifier 13. It is so adjusted that the meter coils 15 and 16 shall receive currents that shall produce equal and opposite fields. This will result in cancellation or balance of the fields when an object 1 of standard proportions is used. In the event that another object 1 is off-size, however, the path lengths of the energy from the transmitters 3 and 7, reflected from the respective surfaces to the receivers 5 and 9, respectively, will be changed in such manner as to produce a change is the resultant field relationship in the coils 15 and 16. The electric energy output of the inverter 17, therefore, will no longer equal and exactly oppose the output of the rectifier 11. The meter needle 18 will then indicate the off-size.

If it is insured by, say, a guide or rod 40, that the material 1 is always kept the same distance from one of the units such as the transmitter 7 and receiver 9, then errors of the order of the wave-length of the transmitted energy can be determined without ambiguity.

If, for example, it is desired to measure thickness deviations of the order of centimeters, centimetric radio waves may be employed; and if the deviations are of the order of feet, lower-frequencied radio energy or sound energy may be used.

The meter coils 15, 16 may be replaced by any well known comparison device, such as an electron tube double diode that will not conduct when the voltages are equal and opposite, but that will give a signal when the voltages change, indicating off-size. A differential device of this character is shown in Fig. 2. The voltage from the rectifier 11 is there shown feeding the plate 19 of the first section of the double diode 23, and the cathode 21 of the second section. The output of the inverter 17 is shown connected in reverse polarity to the connection in Fig. 1, feeding the cathode 20 of the first section, and the plate 22 of the second section in the same polarity as the rectifier 11 feeds the plate 19 and the cathode 21. When the outputs of the rectifier 11 and the inverter 17 are equal, the cathode 20 and plate 22 are at the same potential, respectively, as the plate 19 and the cathode 21, resulting in neither section conducting. If the voltage of the rectifier 11 should change, say, increase, the plate 19 would rise and the first section would conduct, giving an electric voltage signal at the output 25. Similarly, if the inverter output should increase, the second section would conduct, giving a signal at 27. Those signals may be used to control the manufacture of the article 1 in any well known way.

In Fig. 3, there are illustrated transmitters 3 and 7 of the pulsed type, such as a pulsed radio generator, a light stroboscope, or a pulsed sound or supersonic (hereinafter also referred to as embraced within the term "sound") generator. In such case, it may be preferable to trigger the transmitters 3 and 7 simultaneously from a single trigger source 2. The source 2 may be employed to trigger also any well-known television sweep circuit 26 producing a saw-tooth voltage.

Electrons are emitted from a cathode 42 of a cathode ray oscilloscope 30 and pass a control electrode 44 in quantities dependent on the setting of the bias battery 43. The electrons are accelerated past an anode by a supply source 45, passing through a pair of horizontally spaced horizontal deflector plates 48, 49 and a pair of vertically spaced vertical deflector plates 28, 29, finally to impinge as a spot of light on the fluorescent screen 50. The saw-tooth voltage from the sweep circuit 26 will cause the electron stream to deflect horizontally, thereby to produce a horizontal trace 31 on the screen of a cathode-ray oscilloscope indicator 30. The sweep circuit will start a trace on the oscilloscope at the same instant that the transmitters 3 and 7, respectively, send pulses of energy to the opposite sides of the opaque material 1. The receivers 5 and 9 may be photo-cell receivers for light, radio-wave receivers for radio energy, and sound receivers for sound energy. The reflected signals received by them may be detected in the rectifiers 11 and 13, and may be fed, respectively, to the upper and lower deflector plates 29 and 28 of the oscilloscope 30, thereby to produce differential upper and lower deflections of the trace 31. If the path lengths of the waves reflected or emitted from the opposite surfaces of the object are adjusted properly, the voltages from the rectifiers 11 and 13 will arrive at the upper and lower deflector plates 28 and 29, respectively, at exactly the same instant of time. Upon proper adjustment, therefore, on a fixed sample 1, the voltages may be adjusted to be of exactly the same voltage magnitude, so as to produce no deflection of the sweep 31.

If, however, one or both of these path lengths should change, the time of arrival of the upward and downward deflecting voltages would no longer be simultaneous, such that a deflection would appear first in either the upper or lower direction, indicating off-size.

An inverter similar to that of Fig. 1, and a diode as shown in Fig. 2, may also obviously be used here to produce off-size indicating voltage signals for control purposes.

This invention finds particular application in indicating slight changes in size of the material. The wave-length of the energy sources 3, 7 should preferably be chosen to correspond to the magnitude of change in size that is to be detected.

A conducting object 1, for example, may be connected to a radio transmitter 51 so as to serve as an antenna, thus to emit or radiate energy from its opposite surfaces, as illustrated in Fig. 4, instead of being subjected to reflections from separate transmitters. The operation would then be identical with that previously described. The receivers 5 and 9 would receive the energy respectively radiated from the surfaces of the object 1. The adjustment, as previously described, would be such as to produce equal outputs. If a portion of the object 1 should be off-size, so as to be closer to one of the receivers 5 and 9 than to the other, either, perhaps, as the object 1 is moved by the receivers 5 and 9, or as the receivers move past the object 1, the energy radiated from the nearer surface will arrive at its receiver before the energy from the other surface arrives at the other receiver. The phase difference resulting will be detectable in the receivers, as before described. This mode of operation is similar to that prevailing when common antennas are employed to direct rays normally toward the object 1 and to receive the normal reflections.

Instead of the transmitters 3 and 7, for example, transmitting on a fixed frequency, they might transmit frequency modulated waves, according to well-known frequency altimeter principles. The frequency of the transmitters 3 and 7 would change with time and the comparison of the received signals in, say, broad band receivers 5, 9, would indicate off-size of the material 1 as previously described.

Other and further modifications will occur to persons skilled in the art, and all such are considered to fall within the spirit and scope of the invention, as defined in the appended claims.

What is claimed is:

1. Apparatus for measuring the thickness of an opaque object that comprises means for transmitting energy to opposite surfaces of the object along paths each having a predetermined angle of incidence in order that the energy may be reflected from the opposite surfaces of the object along paths each having a corresponding predetermined angle of reflection, means for receiving the reflected energy, means for converting the received energy into electric energy, and means controlled by the electric energy for indicating any change in length of the paths.

2. The apparatus claimed in claim 1 and in which the energy transmitting means comprises a radio transmitter and the energy receiving means comprises a radio receiver.

3. The apparatus claimed in claim 1 and in which the energy transmitting means comprises a sound transmitter and the energy receiving means comprises a sound receiver.

4. The apparatus claimed in claim 1 and in which the energy transmitting means comprises a light-wave transmitter and the energy receiving means comprises a light-wave receiver.

5. The apparatus claimed in claim 1 and in which the indicating means comprises a phase comparator.

6. The apparatus claimed in claim 1 and in which the energy transmitting means comprises a pulsed energy transmitter.

7. The apparatus claimed in claim 1 and in which the energy transmitting means comprises a frequency modulated energy transmitter.

8. The apparatus claimed in claim 1 and in which the indicating means comprises a differential meter.

9. The apparatus claimed in claim 1 and in which the indicating means comprises electron-tube means for producing electric signals representative of changes in the length of the paths.

10. Apparatus of the character described that comprises means for transmitting electromagnetic energy to opposite surfaces of an object along paths each having a predetermined angle of incidence in order that the energy may be reflected from the object along paths each having a corresponding predetermined angle of reflection, means for receiving the reflections, means for the energy received from the opposite surfaces of the object to produce electric signals, and means controlled by the electric signals for indicating any change in path lengths.

11. Apparatus of the character described that comprises means for propagating pulsed energy from points on opposite sides of an opaque object, means for receiving the energy along paths from the respective sides of the object, means for comparing the received energies, and means controlled by the last-named means for indicating any deviations in the path lengths.

12. An electric system having, in combination, means for sending electromagnetic energy along predetermined paths on opposite sides of an object opaque to the electromagnetic energy, means for producing electric energy representative of the electromagnetic energy sent along the predetermined paths, means responsive to the electric energy for comparing the path lengths traveled, and means controlled by the last-named means for indicating any change in the path lengths.

13. An electric system having, in combination, means for transmitting electromagnetic energy to an object opaque to the electromagnetic energy in order to reflect the energy from opposite sides of the object, means for receiving the reflected energy, and cathode-ray-tube-indicating means controlled by the receiving means for indicating any deviation in the thickness of the object.

14. An electric system having, in combination, means for transmitting electromagnetic energy to opposite sides of an object opaque to the electromagnetic energy in order to reflect the energy therefrom, means for receiving the reflected energy and means controlled by the receiving means for producing signal voltages representative of any deviation in the thickness of the opaque object.

15. Apparatus of the character described that comprises means for transmitting energy to different surfaces along different paths, means for receiving the energy reflected from the surfaces, means for differentially interacting the energy received from the surfaces, means for balancing the differentially interacting received energy in order that deviations therefrom may be produced by changes in the lengths of the paths, and means for producing a differential voltage in response to the deviations.

16. An electric system having, in combination, means for propagating pulsed energy from points on opposite sides of an object, means for receiving the energy along paths from the respective sides of the object, means for maintaining one path of constant length, a cathode-ray tube having a screen and an electron stream impinging on the screen, means for producing a time-base on the screen, and means for connecting the receiving means to the cathode-ray tube for causing the energy received along the paths simultaneously and differentially to be displayed along the time-base.

17. An electric system having, in combination, means for transmitting radio-wave energy to different surfaces, means for receiving the energy reflected from the surfaces along different paths, means for rectifying the received energy, means for causing the energy received from the different surfaces after rectification to interact, means for adjusting the interacting rectified energy to effect a balance, deviations from which may be produced by changes in the lengths of the paths, and means for indicating the deviations.

18. An electric system for indicating variations in the separation between two surfaces of an object from a predetermined separation that comprises means for transmitting energy to each surface from one of a pair of transmission points disposed a predetermined fixed distance from the surface at times when the separation between the surfaces is equal to the predetermined separation, means for receiving the transmitted energy after reflection from each surface at one of a pair of reception points disposed a predetermined fixed distance from the surface at the said times and disposed such that the angle of reflection from the surface of the received energy is equal to the angle of incidence upon the surface of the transmitted energy, and means for differentially comparing the energy received from the surfaces at the corresponding reception points, thereby to indicate variations in the separation between the two surfaces.

19. The system claimed in claim 18 and in which means is provided for maintaining the distance between one of the said points and the corresponding surface substantially constant.

20. An electric system for indicating variations in the separation between two surfaces of an object from a predetermined separation that comprises means for transmitting a pulse of radio energy to each surface from a corresponding transmission point disposed a predetermined fixed distance from the surface at times when the separation between the surfaces is equal to the predetermined separation, means for receiving the transmitted pulse of radio energy after reflection from each surface at a corresponding reception point disposed a predetermined fixed distance from the surface at the said times, and means for comparing the instants of reception of the pulses of radio energy received from the surfaces at the corresponding reception points, thereby to indicate variations in the separation between the two surfaces.

21. An electric system for indicating variations in the separation between two surfaces of an object from a predetermined separation that comprises means for transmitting a pulse of sound energy to each surface from a corresponding transmission point disposed a predetermined fixed distance from the surface at times when the separation between the surfaces is equal to the predetermined separation, means for receiving the transmitted pulse of sound energy after reflection from each surface at a corresponding reception point disposed a predetermined fixed distance from the surface at the said times, and means for comparing the instants of reception of the pulses of sound energy received from the surfaces at the corresponding reception points, thereby to indicate variations in the separation between the two surfaces.

22. An electric system for indicating variations in the separation between two surfaces of an object from a predetermined separation that comprises means for transmitting a pulse of light energy to each surface from a corresponding transmission point disposed a predetermined fixed distance from the surface at times when the separation between the surfaces is equal to the predetermined separation, means for receiving the transmitted pulse of light energy after reflection from each surface at a corresponding reception point disposed a predetermined fixed distance from the surface at the said times, and means for comparing the instants of reception of the pulses of light energy received from the surfaces at the corresponding reception points, thereby to indicate variations in the separation between the two surfaces.

23. An electric system for indicating variations in the separation between two surfaces of an object from a predetermined separation that comprises means for transmitting a pulse of energy to each surface from a corresponding transmission point disposed at predetermined fixed distance from the surface at times when the separation between the surfaces is equal to the predetermined separation, means for receiving the transmitted pulse of energy after reflection from each surface at a corresponding reception point disposed a predetermined fixed distance from the surface at the said times, means for maintaining the said distances between one of the surfaces and the corresponding transmission and reception points constant, and means for comparing the instants of reception of the pulses of energy received from the surfaces at the corresponding reception points, thereby to indicate variations in the separation between the two surfaces.

24. An electric system for indicating variations in the separation between two surfaces of an object from a predetermined separation having, in combination, a pair of energy transmitters, one for transmitting energy to each surface only from a corresponding transmission point disposed a predetermined fixed distance from the surface at times when the separation between the surfaces is equal to the predetermined separation, a pair of energy receivers, one for receiving the transmitted energy after reflection from each surface at a corresponding reception point disposed a predetermined fixed distance from the surface at the said times, and means for differentially comparing the energy received from the surfaces at the corresponding reception points, thereby to indicate variations in the separation between the two surfaces.

25. An electric system for measuring the thickness between two oppositely disposed surfaces of an object having, in combination, means for transmitting a pulse of energy to each surface from a corresponding transmission point disposed a predetermined fixed distance from a common reference surface, means for receiving the transmitted pulse of energy after reflection from each of the oppositely disposed surfaces at a corresponding reception point disposed a predetermined fixed distance from the said reference surface, and means for comparing the instants of reception of the pulses of energy received from the oppositely disposed surfaces at the corresponding reception points, thereby to measure the thickness between the oppositely disposed surfaces.

26. Apparatus of the character described that comprises means for propagating pulsed energy from points on opposite sides of an opaque object, means for receiving the energy along paths from the respective sides of the object, means for comparing the received energies, and means controlled by the last-named means for producing electric signals representative of any deviations in the path lengths.

ROBERT HARVEY RINES.

References Cited in the file of this patent

UNITED STATES PATENTS

| Number | Name | Date |
| --- | --- | --- |
| 1,756,462 | Jenkins | Apr. 29, 1930 |
| 1,987,588 | Drake | Jan. 8, 1935 |
| 2,134,535 | Runge | Oct. 25, 1938 |
| 2,147,810 | Alford | Feb. 21, 1939 |
| 2,189,549 | Hershberger | Feb. 6, 1940 |
| 2,225,046 | Hunter | Dec. 17, 1940 |
| 2,248,727 | Strobel | July 8, 1941 |
| 2,280,226 | Firestone | Apr. 21, 1942 |
| 2,351,770 | Koenig | June 20, 1944 |
| 2,364,209 | Green | Dec. 5, 1944 |
| 2,403,625 | Wolff | July 9, 1946 |
| 2,405,239 | Seeley | Aug. 6, 1946 |
| 2,409,030 | Fraenckel et al. | Oct. 8, 1946 |
| 2,412,003 | Neufeld | Dec. 3, 1946 |
| 2,431,305 | Chatterjea et al. | Nov. 25, 1947 |
| 2,441,956 | Deloraine et al. | May 25, 1948 |
| 2,516,296 | Brown | July 25, 1950 |

FOREIGN PATENTS

| Number | Country | Date |
| --- | --- | --- |
| 569,598 | Germany | Jan. 10, 1931 |